United States Patent
Choi

(10) Patent No.: US 12,131,179 B2
(45) Date of Patent: *Oct. 29, 2024

(54) MEMORY SYSTEM AND OPERATING METHOD THEREOF

(71) Applicant: SK hynix Inc., Icheon-si (KR)

(72) Inventor: Hyeong Jae Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,324

(22) Filed: Aug. 1, 2023

(65) Prior Publication Data
US 2023/0376340 A1 Nov. 23, 2023

Related U.S. Application Data

(63) Continuation of application No. 17/148,301, filed on Jan. 13, 2021, now Pat. No. 11,782,746.

(30) Foreign Application Priority Data

Jul. 2, 2020 (KR) .................. 10-2020-0081367

(51) Int. Cl.
*G06F 9/455* (2018.01)
*G06F 9/445* (2018.01)
(Continued)

(52) U.S. Cl.
CPC ...... *G06F 9/45558* (2013.01); *G06F 9/44505* (2013.01); *G06F 9/544* (2013.01);
(Continued)

(58) Field of Classification Search
None
See application file for complete search history.

(56) References Cited

U.S. PATENT DOCUMENTS 7,467,381 B2 * 12/2008 Madukkarumukumana ................ G06F 9/5077
718/1
8,601,473 B1 12/2013 Aron
(Continued)

FOREIGN PATENT DOCUMENTS

CN 110770708 A 2/2020
KR 10-2013-0116110 A 10/2013

OTHER PUBLICATIONS

Request for the Submission of an Opinion for KR Appl. No. 10-2020-0081367, mailed on Sep. 10, 2024, 15 pages with English translation.

*Primary Examiner* — Van H Nguyen
(74) *Attorney, Agent, or Firm* — Perkins Coie LLP

(57) ABSTRACT

A memory system is provided to include a first virtual function controller in communication with a first virtual machine of a host and configured to receive, from the first virtual machine, a command for accessing a namespace and provide, to the first virtual machine, a response to the command; a second virtual function controller in communication with a second virtual machine of the host and configured to be coupled to the namespace and receive the command from the first virtual function controller based on status information of the first virtual function controller and the second virtual function controller; a buffer memory configured to provide an area for data corresponding to the command; and a memory controller configured to access the namespace based on the command and provide the buffer memory with the data.

12 Claims, 9 Drawing Sheets

(51) Int. Cl.
  *G06F 9/54* (2006.01)
  *G06F 13/16* (2006.01)
(52) U.S. Cl.
  CPC .............. *G06F 13/1673* (2013.01); *G06F 2009/45583* (2013.01); *G06F 2009/45595* (2013.01)

(56) References Cited

U.S. PATENT DOCUMENTS

| | | | |
|---|---|---|---|
| 8,756,598 B1 | 6/2014 | Costea | |
| 9,003,071 B2* | 4/2015 | Liu | G06F 9/50 710/9 |
| 9,294,567 B2* | 3/2016 | Hussain | G06F 3/0685 |
| 9,430,268 B2* | 8/2016 | Hussain | H04L 67/1097 |
| 9,501,245 B2 | 11/2016 | Hussain | |
| 9,772,866 B1 | 9/2017 | Aron | |
| 10,228,874 B2* | 3/2019 | Wysocki | G06F 9/45558 |
| 10,809,998 B2 | 10/2020 | Venkatesh | |
| 11,036,533 B2* | 6/2021 | Pinto | G06F 9/546 |
| 11,243,707 B2 | 2/2022 | Cui | |
| 11,288,180 B2* | 3/2022 | Frolikov | G06F 12/0238 |
| 2013/0290470 A1 | 10/2013 | Caradonna et al. | |
| 2014/0108776 A1 | 4/2014 | Miyauchi | |
| 2014/0281040 A1 | 9/2014 | Liu | |
| 2015/0317177 A1 | 11/2015 | Hussain et al. | |
| 2015/0319243 A1 | 11/2015 | Hussain et al. | |
| 2016/0077740 A1 | 3/2016 | Hussain | |
| 2017/0180325 A1 | 6/2017 | Palermo | |
| 2017/0228173 A9 | 8/2017 | Hussain | |
| 2018/0113826 A1 | 4/2018 | Li | |
| 2018/0188985 A1 | 7/2018 | Wysocki et al. | |
| 2019/0004964 A1 | 1/2019 | Kanno | |
| 2019/0230127 A1 | 7/2019 | Gandham et al. | |
| 2020/0042246 A1 | 2/2020 | Maharana et al. | |
| 2022/0004418 A1 | 1/2022 | Choi | |

* cited by examiner

MEMORY SYSTEM AND OPERATING METHOD THEREOF

CROSS-REFERENCE TO RELATED APPLICATION(S)

This patent document is a continuation of U.S. patent application Ser. No. 17/148,301, filed on Jan. 13, 2021, (now U.S. Pat. No. 11,782,746), which claims priority under 35 U.S.C. § 119(a) to Korean Patent Application No. 10-2020-0081367, filed on Jul. 2, 2020, the disclosure of which are incorporated herein by reference in their entireties.

TECHNICAL FIELD

Various embodiments of the present disclosure are related to a memory system that supports a plurality of virtual functions.

BACKGROUND

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

As memory systems do not need a mechanical driving part, the memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a memory system that supports a plurality of virtual functions and an operation method of the memory system. The suggested memory system can have improved access performance.

In accordance with an embodiment, a memory system is provided to include: first and second virtual function controllers corresponding to first and second virtual machines of a host, respectively; a buffer memory; a namespace shared by the first and second virtual function controllers; and a memory controller suitable for controlling the shared namespace, wherein the first virtual function controller provides the second virtual function controller with a command corresponding to the shared namespace received from the first virtual machine, the second virtual function controller controls the memory controller so that data corresponding to the provided command is loaded onto the buffer memory from the shared namespace, in response to the command, and the first virtual function controller provides the first virtual machine with the data loaded onto the buffer memory.

In another aspect, a memory system is provided to include: a first virtual function controller in communication with a first virtual machine of a host and configured to receive, from the first virtual machine, a command for accessing a namespace and provide, to the first virtual machine, a response to the command; a second virtual function controller in communication with a second virtual machine of the host and configured to be coupled to the namespace and receive the command from the first virtual function controller based on status information of the first virtual function controller and the second virtual function controller; a buffer memory in communication with the first virtual function controller and the second virtual function controller and configured to provide an area for data corresponding to the command; and a memory controller in communication with the first virtual function controller and the second virtual function controller and configured to access the namespace based on the command and provide the buffer memory with the data.

In another aspect, an operating method of a memory system that includes first and second virtual function controllers corresponding to first and second virtual machines of a host, respectively, and a namespace shared by the first and second virtual function controllers, the operating method includes: providing, by the first virtual function controller, the second virtual function controller with a command corresponding to the shared namespace received from the first virtual machine; loading, by the second virtual function controller, data corresponding to the provided command onto a buffer memory, included in the memory system, from the shared namespace, in response to the command, and providing, by the first virtual function controller, the first virtual machine with the data loaded onto the buffer memory.

In another aspect, a method for operating a memory system is provided to comprise: receiving, by a first virtual function controller of the memory system in communication with a first virtual machine of a host, a command for accessing a namespace in the memory system, the host further including a second virtual machine and a third virtual machine that are in communication with a second virtual function controller and a third virtual function controller, respectively, and are coupled to the name space; selecting, by the first virtual function controller, one of the second virtual function controller and the third virtual function controller as a selected virtual function controller based on status information of the first virtual function controller, the second virtual function controller, and the third virtual function controller; sending, by the first virtual function controller, the command to the selected virtual function controller; receiving, by the first virtual function controller, access information to access to data corresponding to the command from the selected virtual function controller; and sending, by the first virtual function controller, the data to the first virtual machine.

DETAILED DESCRIPTION

Hereinafter, various embodiments of the present disclosure will be described below in detail with reference to the accompanying drawings.

Figure 1:
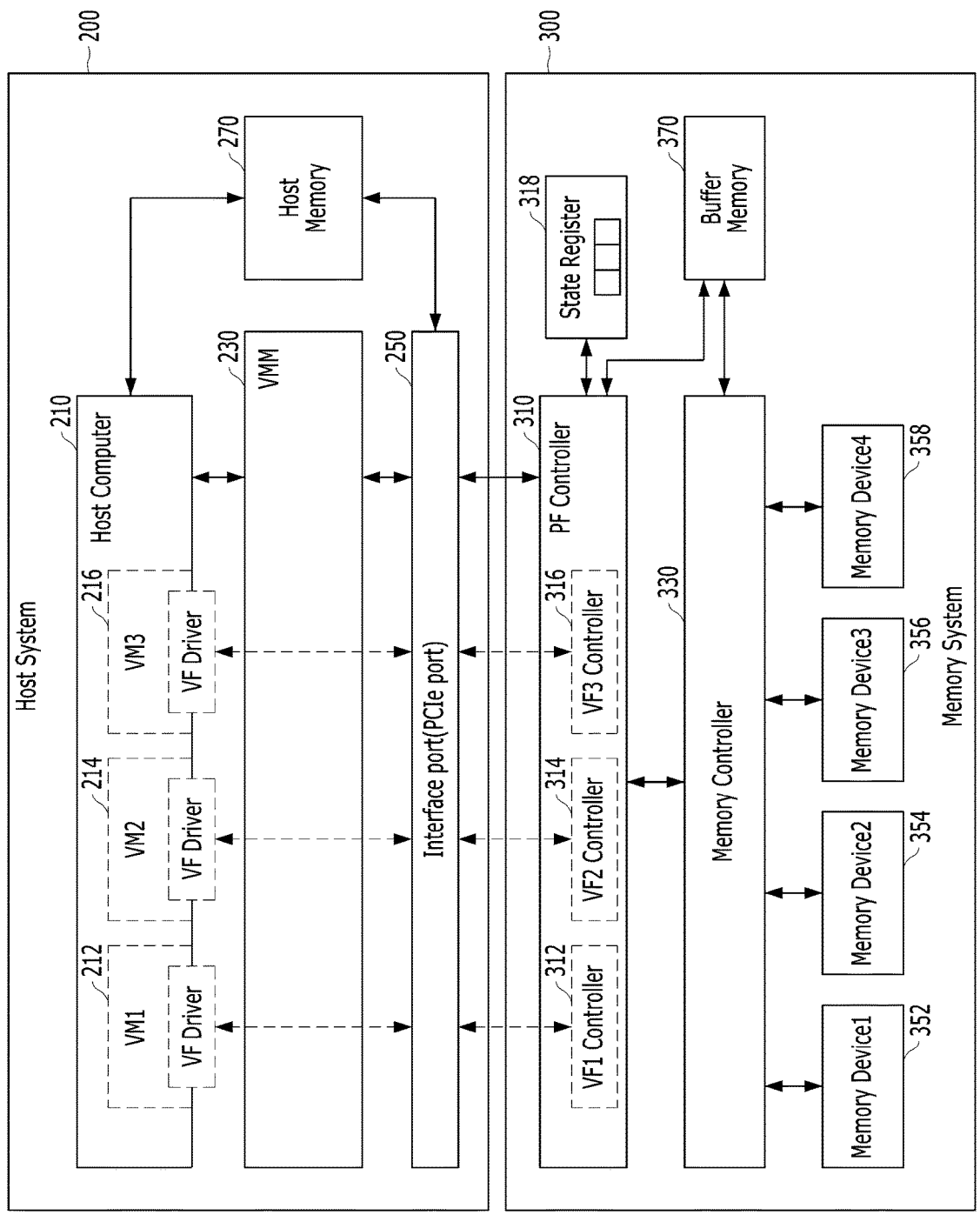
FIGS. 1 and 2 are diagrams illustrating a data processing system including a memory system in accordance with an embodiment of the disclosed technology.
Figure 2:
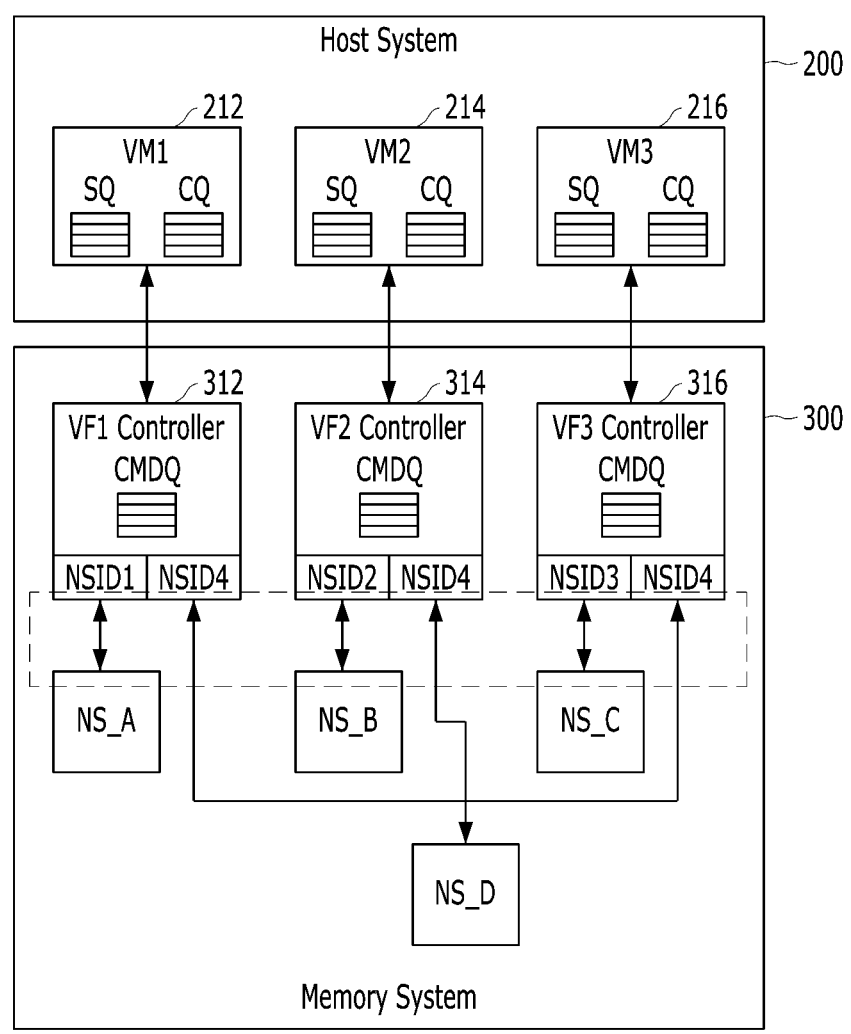

FIGS. 1 and 2 are diagrams illustrating a data processing system 100 including a memory system 300 in accordance with an embodiment of the disclosed technology.

Referring to FIG. 1, the data processing system 100 may include a host system 200 and the memory system 300 in communication with the host system 200.

The host system 200 may include any of various portable electronic devices such as a mobile phone, an MP3 player and a laptop computer, or any of various non-portable electronic devices such as a desktop computer, a game machine, a television (TV) and a projector.

The host system 200 may include at least one operating system (OS), which may manage and control overall functions and operations of the host system 200, and provide interaction between the host system 200 and a user using the data processing system 100 or the memory system 3000. The OS may support functions and operations corresponding to the use purpose and usage of a user, and be divided into a general OS and a mobile OS, depending on mobility of the host system 200. The general OS may be divided into a personal OS and an enterprise OS, depending on a use environment of the user.

The memory system 300 may operate to store data of the host system 200 in response to a request of the host system 200. For example, the memory system 300 may be implemented as any of various types of storage devices such as a solid state drive (SSD), a multi-media card (MMC), a secure digital (SD) card, a universal serial bus (USB) storage device, a universal flash storage (UFS) device, a compact flash (CF) card, a smart media card (SMC) and memory stick. The MMC may include an embedded MMC (eMMC), a reduced size MMC (RS-MMC) and a micro-MMC, and the like. The SD card may include a mini-SD card and micro-SD card.

The memory system 300 may be implemented as any one of various types of storage devices. Examples of such storage devices may include volatile memory devices such as a dynamic random access memory (DRAM) and a static RAM (SRAM). Other examples of the storage devices may include non-volatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magnetic RAM (MRAM), a resistive RAM (RRAM or ReRAM) and a flash memory. The flash memory may have a three-dimensional (3D) stack structure.

The host system 200 may include a host computer 210, a host memory 270 and an interface port 250.

The host computer 210 may drive the OS of the host system 200, and execute commands of programs. The host computer 210 may be implemented as a single core or multiple cores.

The host system 200 may drive a plurality of virtual machines 212, 214 and 216. The plurality of virtual machines 212, 214 and 216 may be implemented as software in a physical machine, such as the host computer 210. Each of the virtual machines 212, 214 and 216 may function as a guest operating system. The plurality of virtual machines 212, 214 and 216 may include virtual function (VF) drivers for communication between devices coupled to the host system 200. In FIG. 1, the plurality of virtual machines 212, 214 and 216 and the VF drivers are represented by dotted lines.

The host memory 270 may be a volatile memory that stores data related to the OS driven by the host system 200. For example, the host memory 270 may be implemented as a volatile memory such as a dynamic random access memory (DRAM) and a static RAM (SRAM).

The interface port 250 may support data communication with a device coupled to the host system 200. For example, the interface port 250 may support data communication between the host system 200 and the memory system 300.

The host system 200 may further include a virtual machine manager 230 for managing the plurality of virtual machines 212, 214 and 216. The virtual machine manager 230 may also be referred to as a hypervisor. The virtual machine manager 230 may allocate a hardware resource to each of the virtual machines 212, 214 and 216, and allow each of the virtual machines 212, 214 and 216 to access the allocated resource.

When data input/output (I/O) between the plurality of virtual machines 212, 214 and 216 and other devices are performed under the intermediation of the virtual machine manager 230, a bottleneck of the data I/O may occur. In order to prevent the bottleneck, the interface port 250 may support server virtualization technology such as single root I/O virtualization (SR-IOV).

The memory system 300 may include a plurality of memory devices 352, 354, 356 and 358, a memory controller 330, a buffer memory 370 and a physical function controller 310. The memory system 300 may support the SR-IOV.

The physical function controller 310 may support the data communication between the memory system 300 and the host system 200 coupled thereto. For example, the physical function controller 310 may support communication with the host computer 210 through the interface port 250. In addition, the physical function controller 310 may control a PCIe function.

The PCIe function refers to a device or module whose access is controlled by a PCIe bus. The PCIe function may include a physical function and a virtual function.

The physical function may be a full PCIe function supporting an SR-IOV extension function.

The virtual function may be a lightweight function including resources required for data movement. For example, the virtual function may include at least a portion of storage space of the plurality of memory devices 352, 354, 356 and 358, and include virtual function controllers that enable the data movement among the virtual function controllers and the virtual machines 212, 214 and 216.

The virtual machines 212, 214 and 216 driven in the host system 200 may access the memory system 300 through the respective virtual function controllers. In an example of FIG. 1, the first virtual machine 212 may correspond to a first virtual function controller 312, the second virtual machine 214 may correspond to a second virtual function controller 314, and the third virtual machine 216 may correspond to a third virtual function controller 316. Each of the virtual machines 212, 214 and 216 may communicate with the corresponding virtual function controller by using a virtual function driver. In FIG. 1, the plurality of virtual function controllers 312, 314 and 316 are represented by dotted lines.

When using the SR-IOV, data may be moved between a virtual machine and a virtual function controller corresponding thereto without going through the virtual machine manager 230. For example, the first virtual machine 212 may store an access command for the memory in the host memory 270. The first virtual machine 212 may provide the first virtual function controller 312 with a pointer indicating a location of the host memory 270 in which the access command is stored, without going through the virtual machine manager 230. The first virtual function controller 312 may acquire the access command by accessing the host memory 270 using the pointer. In FIG. 1, virtualized connections between the plurality of virtual machines 212, 214 and 216 and the virtual function controllers 312, 314 and 316 are represented as dotted arrows. In addition, in FIG. 1, physical connection relationships among the host computer 210, the host memory 270, the interface port 250 and the physical function controller 310 are represented as solid arrows to support the virtualized connections.

The plurality of memory devices 352, 354, 356 and 358 may be non-volatile memory devices, and retain data stored therein even though power is not supplied. The plurality of memory devices 352, 354, 356 and 358 may store data provided from the host system 200 through a program operation, and provide data stored therein to the host system 200 through a read operation. Each of the memory devices 352, 354, 356 and 358 may include a plurality of memory blocks, each of the memory blocks may include a plurality of pages, and each of the pages may include a plurality of memory cells coupled to a word line. In an embodiment, the plurality of memory devices 352, 354, 356 and 358 may be a flash memory, for example, a NAND flash memory. The flash memory may have a 3D stack structure.

When the plurality of memory devices 352, 354, 356 and 358 are flash memory devices, the flash memory devices may store data in a memory cell array composed of memory cell transistors. The plurality of memory devices 352, 354, 356 and 358 may have a hierarchical structure of memory dies, planes, memory blocks and pages. For example, each of the plurality of memory devices 352, 354, 356 and 358 may correspond to one memory die. One memory die may include a plurality of planes, and the plurality of planes may process commands received by the memory die in parallel. Each of the planes may include a plurality of memory blocks. Each of the memory blocks may be a minimum unit of an erase operation. One memory block may include a plurality of pages. Each of the pages may be a minimum unit of a write operation.

The memory controller 330 may be implemented as a microprocessor or a processor of a central processing unit (CPU). The memory controller 330 may control the plurality of memory devices 352, 354, 356 and 358 in response to a request from the host system 200. For example, the memory controller 330 may provide the host system 200 with data read from the plurality of memory devices 352, 354, 356 and 358, and store data provided from the host system 200 in the plurality of memory devices 352, 354, 356 and 358. For this operation, the memory controller 330 may control read, program and erase operations of the plurality of memory devices 352, 354, 356, and 358.

In addition, the memory controller 330 may perform a background operation on the plurality of memory devices 352, 354, 356 and 358. For example, the background operation on the plurality of memory devices 352, 354, 356 and 358 may include a garbage collection (GC) operation, a wear leveling (WL) operation, a map flush operation, a bad block management operation and so on.

The buffer memory 370 may store data related to write and read operations of the memory system 300. For example, the buffer memory 370 may buffer data to be stored in the memory device in response to a write command from the host system 200. Further, the buffer memory 370 may buffer data loaded by the memory controller 330 from the memory device in response to a read command from the host system 200.

The buffer memory 370 may be implemented as a volatile memory. For example, the buffer memory 370 may be implemented as a static random access memory (SRAM) or a dynamic random access memory (DRAM). The buffer memory 370 may be disposed inside or outside the memory controller 330. FIG. 1 illustrates the buffer memory 370 disposed outside the memory controller 330.

Constituent elements included in the memory system 300 may be integrated into a single semiconductor device. For example, the physical function controller 310, the memory controller 330, the plurality of memory devices 352, 354, 356 and 358 and the buffer memory 370 may be integrated as one semiconductor device to constitute a solid state drive (SSD). When the memory system 300 is used as the SSD, the operating speed of the host system 200 coupled to the memory system 300 may be improved. In addition, the physical function controller 310, the memory controller 330, the plurality of memory devices 352, 354, 356 and 358 and the buffer memory 370 may be integrated as one semiconductor device to constitute a memory card. For example, the physical function controller 310, the memory controller 330, the plurality of memory devices 352, 354, 356 and 358 and the buffer memory 370 may be integrated as one semiconductor device to constitute a memory card such as a personal computer memory card international association (PCMCIA) card, a compact flash (CF) card, a smart media (SM) card, memory stick, a multimedia card (MMC) including a reduced size MMC (RS-MMC) and a micro-MMC, a secure digital (SD) card including a mini-SD card, a micro-SD card and an SDHC card, or a universal flash storage (UFS) device.

FIG. 2 is a diagram illustrating a method for a virtual machine to access a memory system through a virtual function controller.

FIG. 2 illustrates a data processing system 100 including a host system 200 and a memory system 300. The host system 200 and the memory system 300 of FIG. 2 correspond to the host system 200 and the memory system 300 described above with reference to FIG. 1, respectively.

The memory system 300 may include a plurality of namespaces NS_A, NS_B, NS_C and NS_D, each of which is an addressable logical memory space or domain associated with the physical memory space in the memory system 300. The memory controller 330 may logically allocate storage spaces of the four memory devices 352, 354, 356 and 358, which are illustrated in FIG. 1 to the four namespaces NS_A, NS_B, NS_C and NS_D. For example, the memory controller 330 may allocate logical addresses in a predetermined range to each of the four namespaces NS_A, NS_B, NS_C and NS_D. The namespaces NS_A, NS_B, NS_C and NS_D may have the same storage capacity or different storage capacities based on implementations.

The memory controller 330 may provide each virtual function with one or more namespaces. Each of the namespaces may be provided to one or more virtual functions. The namespace provided only to one virtual function may be referred to as a dedicated namespace, and the namespace provided to a plurality of virtual functions may be referred to as a shared namespace.

Each of the namespaces may have a unique namespace identifier (NSID). In an example of FIG. 2, the plurality of namespaces NS_A, NS_B, NS_C and NS_D may be identified as NSID1, NSID2, NSID3 and NSID4, respectively. The host system 200 may specify an NSID and a logical address to access the storage space of each of the namespaces.

A virtual function controller may access one or more namespaces. A virtual machine may access the one or more namespaces through the virtual function controller. In the example of FIG. 2, a first virtual machine 212 may access the namespaces NS_A and NS_D through a first virtual function controller 312. A second virtual machine 214 may access the namespaces NS_B and NS_D through a second virtual function controller 314. A third virtual machine 216 may access the namespaces NS_C and NS_D through a third virtual function controller 316.

Each of the namespaces NS_A, NS_B and NS_C may be the dedicated namespace accessible only by a corresponding virtual function controller. The namespace NS_D may be the shared namespace accessible by a plurality of virtual function controllers.

Each of the virtual machines may provide the memory system 300 with a command, and use one or more command queues to receive a response to the command from the memory system 300. For example, each of the virtual machines may use a submission queue SQ and a complete queue CQ. The submission queue SQ and a complete queue CQ may be included in a host memory 270. For example, the virtual machine may queue the command to the submission queue SQ, and notify the virtual function controller corresponding to the command of a location of the queued command, by using a submission queue doorbell register. The virtual function controller may access the location to obtain the command, and queue the command to an internal command queue CMDQ. The virtual function controller may provide a response by using a complete queue doorbell register when the command queued to the internal command queue CMDQ is completely processed. The submission queue doorbell register and the complete queue doorbell register may be included in the host memory 270.

When using SR-IOV, each of the virtual machines may avoid going through a virtual machine manager 230 and use a corresponding virtual function controller so as to exchange commands and data with the memory system 300. Therefore, a bottleneck of data input/output between the plurality of virtual machines and the plurality of virtual function controllers can be reduced.

However, when the host system 200 provides one virtual function controller among the plurality of the virtual function controller with a plurality of access commands, a response through the virtual function controller can be delayed.

Figure 3:
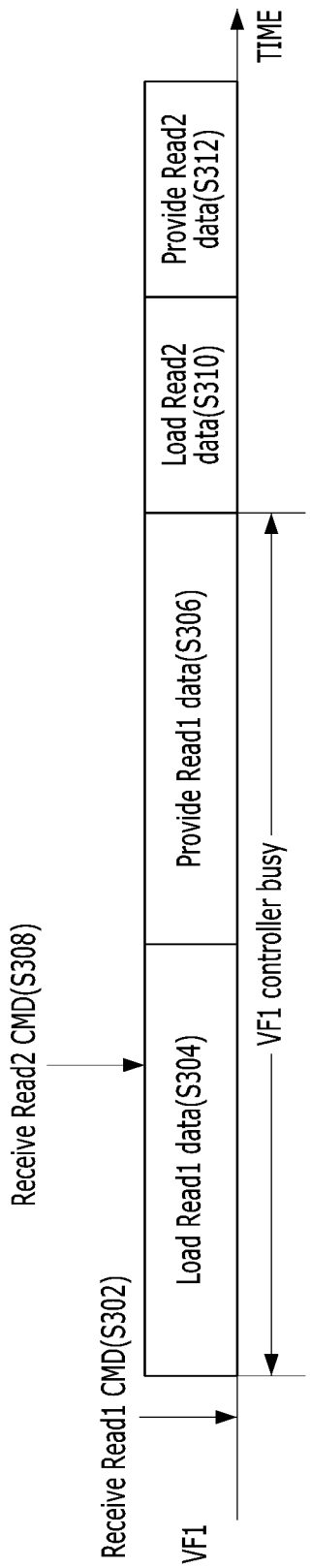
FIG. 3 is a diagram illustrating an operation of a data processing system when a single virtual function performs a plurality of command operations.

FIG. 3 is a diagram illustrating an operation of the data processing system 100 when a single virtual function performs a plurality of command operations.

FIG. 3 illustrates an operational timing when the first virtual function controller 312 receives first and second read commands.

In step S302, the first virtual function controller 312 may receive the first read command from the first virtual machine 212.

For example, the first virtual function controller 312 may receive, from the first virtual machine 212, an address of the host memory 270 corresponding to a location in which the first read command is stored by using a submission queue doorbell register. The first virtual function controller 312 may fetch the first read command from the host memory 270 by using the address.

In step S304, the first virtual function controller 312 may load first read data, corresponding to the first read command, onto the buffer memory 370.

For example, the first virtual function controller 312 may allocate a buffer space, which is to load the first read data, to the buffer memory 370. The first virtual function controller 312 may provide the memory controller 330 with the first read command. The memory controller 330 may load the first read data onto the allocated buffer space from a memory device in which the first read data is stored, based on an NSID and a logical address included in the first read command.

In step S306, the first virtual function controller 312 may provide the first virtual machine 212 with the first read data loaded onto the buffer memory 370.

For example, the first virtual function controller 312 may provide the host memory 270 with the first read data, and provide the first virtual machine 212 with a response by using a complete queue doorbell register.

Based on the control of the first virtual function controller 312, the memory controller 330 processes the command received from the first virtual machine 212 and provides the first virtual machine 212 with the response. The first virtual function controller 312 may be in a busy state while the first virtual function controller 312 controls the memory controller 330 such that the memory controller 330 processes the command received from the first virtual machine 212 and provides the response to the first virtual machine 212. With reference to FIG. 3, the first virtual function controller 312 is in the busy state while steps S304 and S306 are being performed. Virtual function controllers may be designed not to process commands if the virtual functions controllers are in the busy state in order to guarantee atomicity of virtual functions. Thus, although the virtual function controller has received a command, such received command may be not processed if the virtual function controller is in the busy state.

For example, while the first virtual function controller 312 loads the first read data in response to the first read command, the first virtual function controller 312 may receive the second read command from the first virtual machine 212, in step S308. The first virtual function controller 312 may not process the second read command until the first virtual function controller 312 loads the first read data and provides a host with the first read data.

When the first virtual function controller 312 the busy state due to the first read command terminates, the first virtual function controller 312 may process the second read command and provide the first virtual machine 212 with a response to the second read command.

For example, in step S310 when the first virtual function controller 312 is not busy any longer, the first virtual function controller 312 may provide the memory controller 330 with the second read command, and control the memory controller 330 to load second read data, corresponding to the second read command, onto the buffer memory 370.

Then, in step S312, the first virtual function controller 312 may provide the first virtual machine 212 with the second read data.

When the first virtual function controller 312 performs step S306, the memory controller 330 and the plurality of memory devices 352, 354, 356 and 358 may not perform an operation for a host command. For example, the first virtual function controller 312 may be in the busy state, but other virtual function controllers may be in an idle state. Thus, under this situation in which the memory controller 330 and the plurality of memory devices 352, 354, 356 and 358 do not process the second read command even when they are in the idle state without performing any operations for the host command, the memory system 300 has limitations on the access efficiency.

Some embodiments of the present disclosure provide a memory system in which a command provided to a specific virtual function controller is processed by another specific virtual function controller under some conditions. For example, a specific virtual machine in communication with a corresponding virtual function controller provides a command for a shared namespace through the corresponding virtual function controller. When some conditions are met, the command can be processed by another virtual function controller other than the corresponding virtual function controller.

For example, while the first virtual function controller 312 is in the busy state due to the first read command, if the second read command for the shared namespace is provided to the first virtual function controller 312, the first virtual function controller 312 may control the second virtual function controller 314, which is in the idle state and shares the shared namespace, to process the second read command. The second virtual function controller 314 may load read data for the second read command onto the buffer memory 370, and provide the first virtual function controller 312 with access information for a space of the buffer memory 370 onto which the read data is loaded. By doing this, the first virtual function controller 312 may provide the first virtual machine 212 with the read data. According to these embodiments, access performance to the shared namespace can be improved.

In some embodiments of the present disclosure, the memory system 300 may further include a state register 318 indicating whether each virtual function controller is in the busy or idle state. Referring to FIG. 1, the state register 318 may be coupled to the physical function controller 310 that controls the plurality of virtual function controllers 312, 314 and 316. The physical function controller 310 may provide a virtual function controller with a signal, and when the physical function controller 310 does not receive a response to the signal within a predetermined time, the physical function controller 310 may indicate in the state register 318 that the virtual function controller is in the busy state.

Hereinafter, embodiments of the present disclosure will be described in detail with reference to FIGS. 4 to 9.

Figure 4:
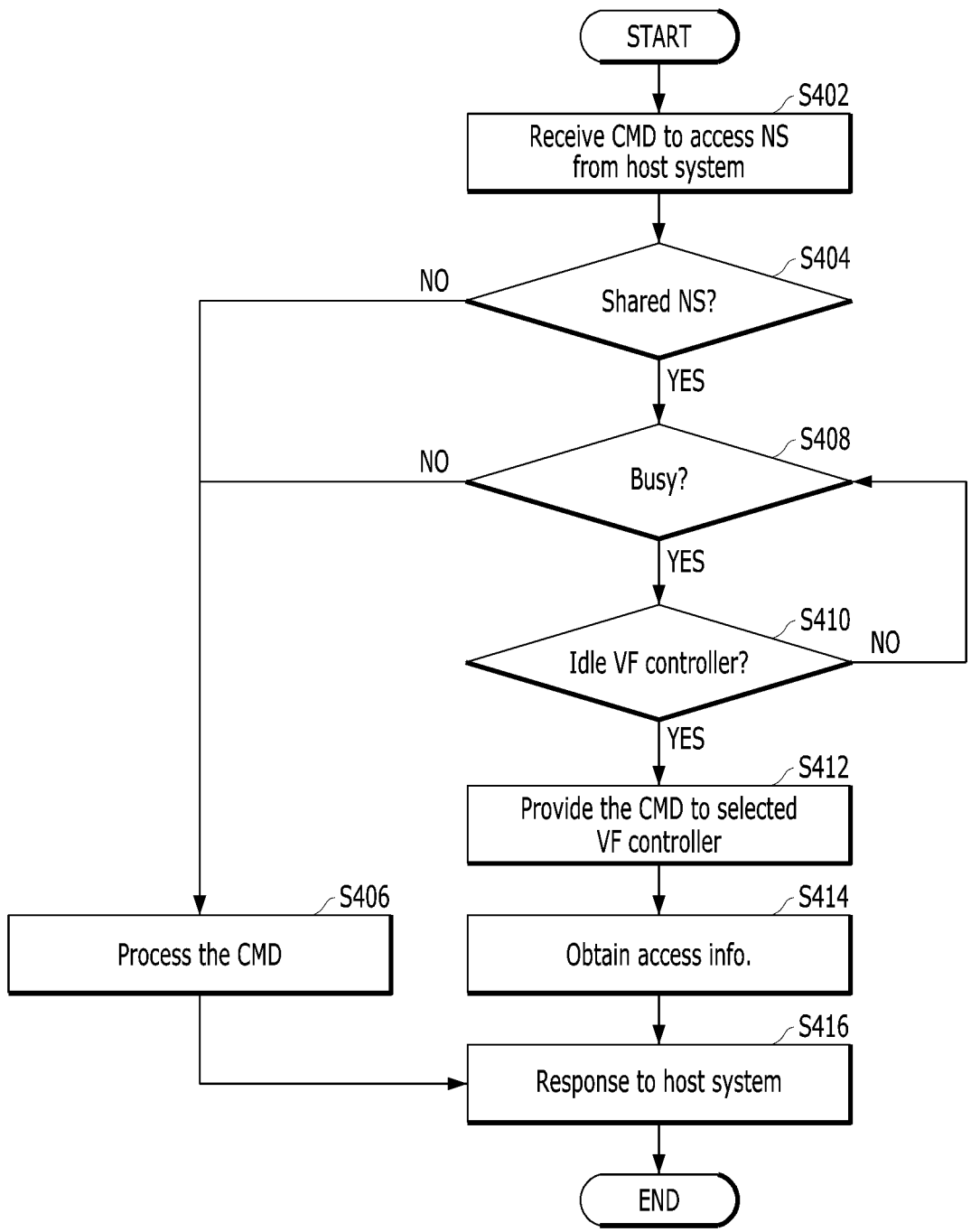
FIGS. 4 to 6 are diagrams illustrating an operation of a memory system in accordance with a first embodiment of the disclosed technology.
Figure 5:
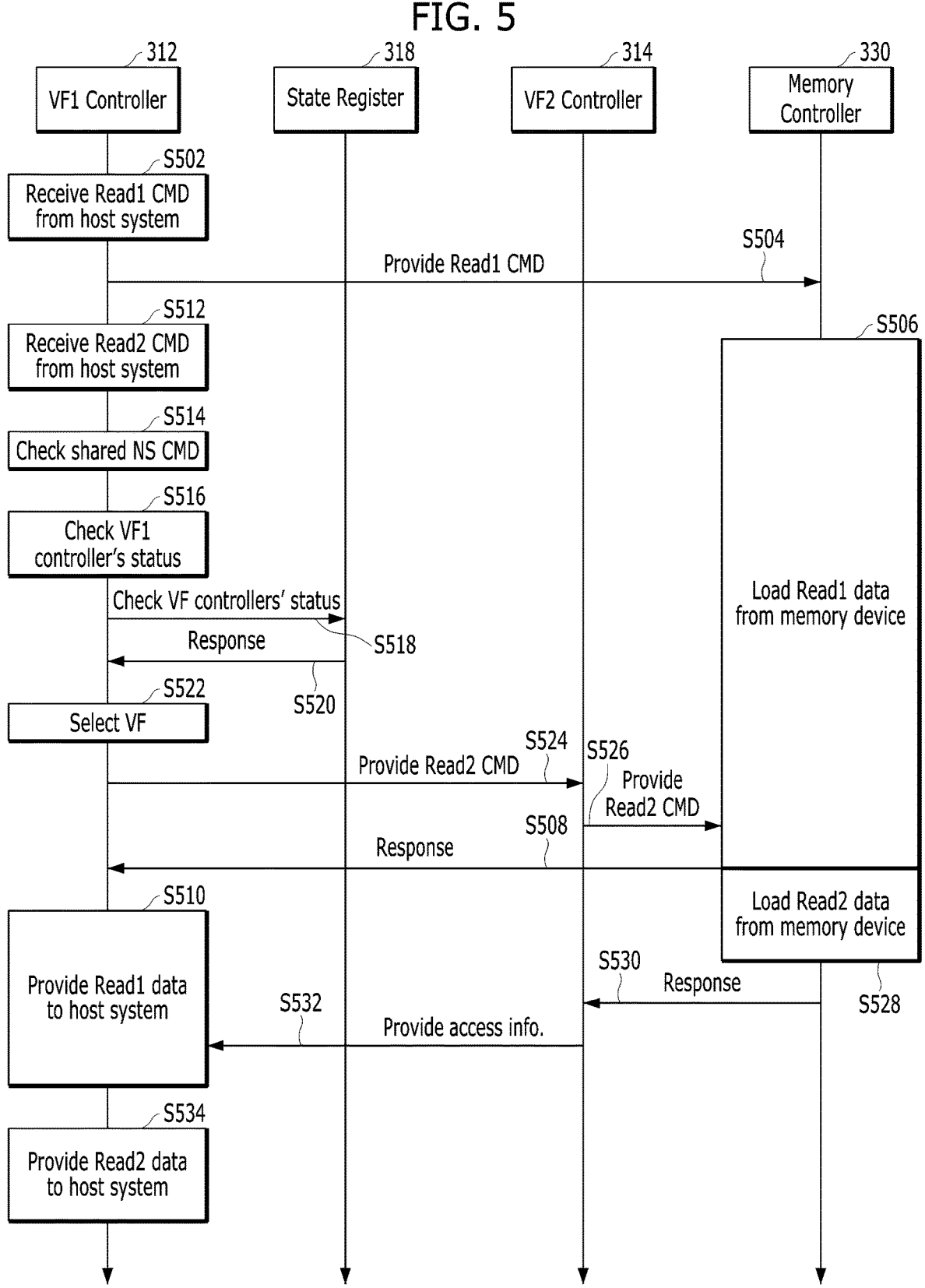
Figure 6:
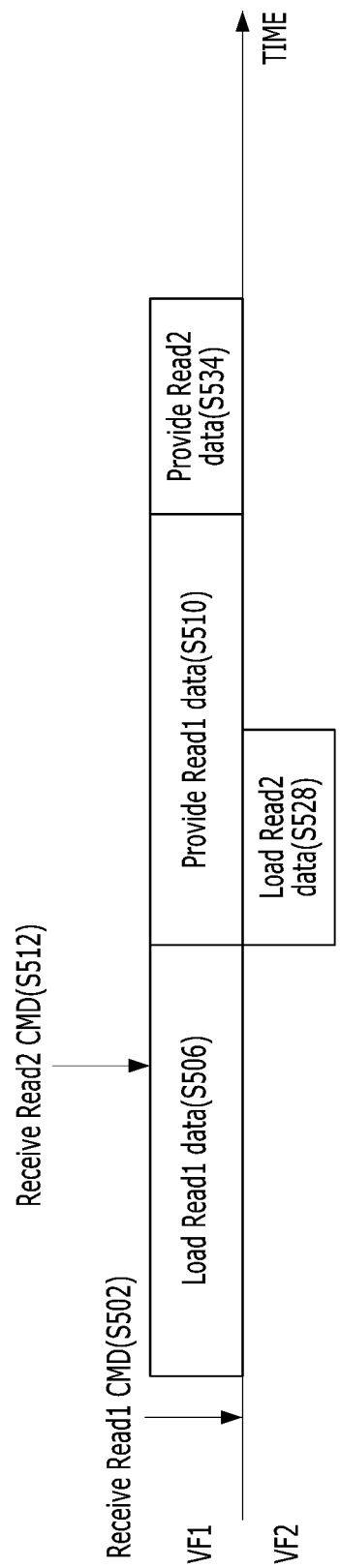

FIGS. 4 to 6 are diagrams illustrating an operation of the memory system 300 in accordance with a first embodiment.

FIG. 4 is a flowchart illustrating an operation of a virtual function controller in accordance with a first embodiment of the disclosed technology. FIG. 4 illustrates that the first virtual function controller 312 performs steps S402, S404, S406, S408, S410, S412, S414 and S416.

In step S402, the first virtual function controller 312 may receive, from the host system 200, a read command for accessing a namespace. The read command may include an NSID.

In step S404, the first virtual function controller 312 may determine whether the read command is for accessing a shared namespace, based on the namespace identification data (NSID) included in the read command.

When the read command is not for accessing the shared namespace (that is, "NO" in step S404), the first virtual function controller 312 may directly process the read command in step S406.

For example, the first virtual function controller 312 may allocate a space of the buffer memory 370 for loading read data corresponding to the read command, and provide the memory controller 330 with the read command. The memory controller 330 may load the read data corresponding to the read command onto the allocated space of the buffer memory 370.

In step S416, in response to the read command, the first virtual function controller 312 may provide the host system 200 with the read data loaded onto the allocated space of the buffer memory 370.

When the read command is for accessing the shared namespace (that is, "YES" in step S404), the first virtual function controller 312 may determine whether the first virtual function controller 312 is in a busy state, in step S408.

When the first virtual function controller 312 is not in the busy state (that is, "NO" in step S408), the first virtual function controller 312 may perform steps S406 and S416.

When the first virtual function controller 312 is in the busy state (that is, "YES" in step S408), in step S410, the first virtual function controller 312 may determine whether there is a virtual function in an idle state among virtual functions that share the shared namespace.

In the example of FIG. 2, the first to third virtual function controllers 312, 314 and 316 are coupled to the namespace NS_D. Thus, in the example of FIG. 2, the first to third virtual function controllers 312, 314 and 316 share the namespace NS_D. The first virtual function controller 312 may determine whether the second and third virtual function controllers 314 and 316 are in the idle state.

The state register 318 coupled to the physical function controller 310 may represent whether the virtual function controllers are in the busy or idle state. The first virtual function controller 312 may access the state register 318 coupled to the physical function controller 310, and determine whether the second and third virtual function controllers 314 and 316 are in the idle state.

When the second and third virtual function controllers 314 and 316 are all in the busy state (that is, "NO" in step S410), the first virtual function controller 312 may repeatedly perform steps S408 and S410 until any one of the first to third virtual function controllers 312, 314 and 316 becomes the idle state.

When at least one of the second and third virtual function controllers 314 and 316 is in the idle state (that is, "YES" in step S410), the first virtual function controller 312 may select the virtual function controller in the idle state, and provide the selected virtual function controller with the read command, in step S412. The operation of providing the selected virtual function controller with the read command by the first virtual function controller 312 may be controlled by the physical function controller 310.

The selected virtual function controller may process the read command. For example, the selected virtual function controller may allocate the space of the buffer memory 370 for the read command, receive the read command and transmit the received read command to the memory controller 330. The read data corresponding to the read command may be loaded onto the allocated space of the buffer memory 370.

The first virtual function controller 312 may obtain access information for the allocated space of the buffer memory 370 from the selected virtual function controller in step S414, and may perform step S416. For example, the selected virtual function controller may provide the first virtual function controller 312 with an address indicating the allocated space of the buffer memory 370.

According to the first embodiment of the present disclosure, when a virtual function controller receives a read command for accessing a shared namespace while the virtual function controller is in a busy state, another virtual function controller that shares the shared namespace and in an idle sate is configured to process the read command. Thus, throughput between virtual function controllers may be distributed, and access performance of the memory system 300 may be improved.

FIG. 5 illustrates transactions between constituent elements of a memory system based on the first embodiment of the disclosed technology.

FIG. 5 illustrates transactions of the first and second virtual function controllers 312 and 314, the state register 318 and the memory controller 330. The contents already described with reference to FIG. 4 are omitted or briefly described.

In step S502, the first virtual function controller 312 may receive a first read command from the host system 200. The first virtual function controller 312 may check whether the first read command is a command for accessing a shared namespace and whether it is in a busy state, as described in steps S404, S406, S408 and S410. As an example, FIG. 5 illustrates the first embodiment of the present disclosure where the first virtual function controller 312 directly processes the command as described in step S406.

In steps S504, S506 and S508, the first virtual function controller 312 may process the first read command.

In step S504, the first virtual function controller 312 may provide the memory controller 330 with the first read command. The first virtual function controller 312 may allocate a memory space, onto which first read data corresponding to the first read command are to be loaded, to the buffer memory 370.

In step S506, the memory controller 330 may load the first read data from a memory device in response to the first read command.

When the memory controller 330 loads all the first read data, the memory controller 330 may provide the first virtual function controller 312 with a response, in step S508.

In step S510, the first virtual function controller 312 may provide the host system 200 with the first read data.

During steps S504, S506, S508 and S510, the first virtual function controller 312 may be in the busy state. When the first virtual function controller 312 is in the busy state, the first virtual function controller 312 may receive a command from the host system 200.

For example, in step S512 while step S506 is being performed, the first virtual function controller 312 may receive a second read command from the host system 200.

In step S514, the first virtual function controller 312 may determine whether the second read command is a command for accessing the shared namespace. In an example of FIG. 5, it is assumed that the second read command is the command for accessing the shared namespace.

In step S516, the first virtual function controller 312 may determine its own state. In the example of FIG. 5, since the first virtual function controller 312 is processing the first read command, it may be determined that the first virtual function controller 312 is in the busy state.

In step S518, the first virtual function controller 312 may access the state register 318 in order to determine states of virtual function controllers that share the shared namespace.

In step S520, the state register 318 may provide state information of each of the virtual function controllers in response to the access of the first virtual function controller 312.

In step S522, the first virtual function controller 312 may select one virtual function controller in an idle state, in order to control the selected virtual function controller to process the second read command instead. In the example of FIG. 5, it is assumed that the second virtual function controller 314 is in the idle state, and the second virtual function controller 314 is selected by the first virtual function controller 312.

In step S524, the first virtual function controller 312 may provide the second virtual function controller 314 with the second read command.

In steps S526, S528 and S530, the second virtual function controller 314 may process the second read command.

In step S526, the second virtual function controller 314 may provide the memory controller 330 with the second read command. The second virtual function controller 314 may allocate a memory space, onto which second read data corresponding to the second read command is to be loaded, to the buffer memory 370.

In step S528, the memory controller 330 may load the second read data from the shared namespace of the memory device in response to the second read command.

FIG. 5 illustrates a case in which step S528 is performed after the operation of loading the first read data in step S506 is completely performed. However, in some cases, the first and second read data may be simultaneously loaded. As described with reference to FIG. 1, each of the plurality of memory devices 352, 354, 356 and 358 included in the memory system 300 may operate in parallel. Whether the first and second read data are simultaneously read or sequentially read may be determined according to respective memory devices in which the first and second read data are stored and command scheduling of the memory controller 330. For example, when the first and second read data are stored in different memory devices, the first and second read data may be loaded simultaneously. When the first and second read data are stored in the same memory device, the second read data may be loaded after all of the first read data are loaded.

According to an embodiment, the memory controller 330 may allocate storage spaces to namespaces such that a shared namespace and a dedicated namespace include storage spaces of different memory devices. When the first read command is a command for accessing the dedicated namespace, and the second read command is a command for accessing the shared namespace, the first and second data may be simultaneously loaded from the plurality of memory devices 352, 354, 356 and 358.

When the second read data is completely loaded, the memory controller 330 may provide the second virtual function controller 314 with a response, in step S530.

In step S532, the second virtual function controller 314 may provide the first virtual function controller 312 with access information for a space of the buffer memory 370 onto which the second read data is loaded.

In step S534, the first virtual function controller 312 may access the space of the buffer memory 370 based on the access information, and provide the host system 200 with the second read data.

FIG. 6 schematically illustrates an operational timing according to the first embodiment described above with reference to FIG. 5.

FIG. 6 illustrates operational timings of a first virtual function VF1 and a second virtual function VF2 on the same time axis. FIG. 6 represents the operational timings of some of the steps described with reference to FIG. 5.

Referring to FIG. 6, the first virtual function controller 312 may receive the first read command from the host system 200 in step S502, the memory controller 330 may load the first read data in step S506, and the first virtual function controller 312 may provide the host system 200 with the first read data in step S510. In steps S506 and S510, the first virtual function controller 312 may be in a busy state. In the busy state, the first virtual function controller 312 may not process a new command.

In step S512, the first virtual function controller 312 may receive the second read command when being in the busy state. When the second read command is a command for accessing a shared namespace, the first virtual function controller 312 may control the second virtual function controller 314 in an idle state to process the second read command.

In step S528, the memory controller 330 may load the second read data. While the first virtual function controller 312 provides the host system 200 with the first read data in step S510, the memory controller 330 may load the second read data under the control of the second virtual function controller 314, in step S528.

In step S534, the second virtual function controller 314 may provide the host system 200 with the second read data.

According to the first embodiment of the present disclosure, data throughput concentrated in a specific virtual function controller may be distributed to other virtual function controllers. Comparing FIG. 3 with FIG. 6, when a plurality of commands are received by one virtual function controller, entire command processing time may be reduced in a case where a plurality of virtual function controllers process the plurality of commands in a distributed manner, as compared to a case where the one virtual function controller processes the plurality of commands.

Figure 7:
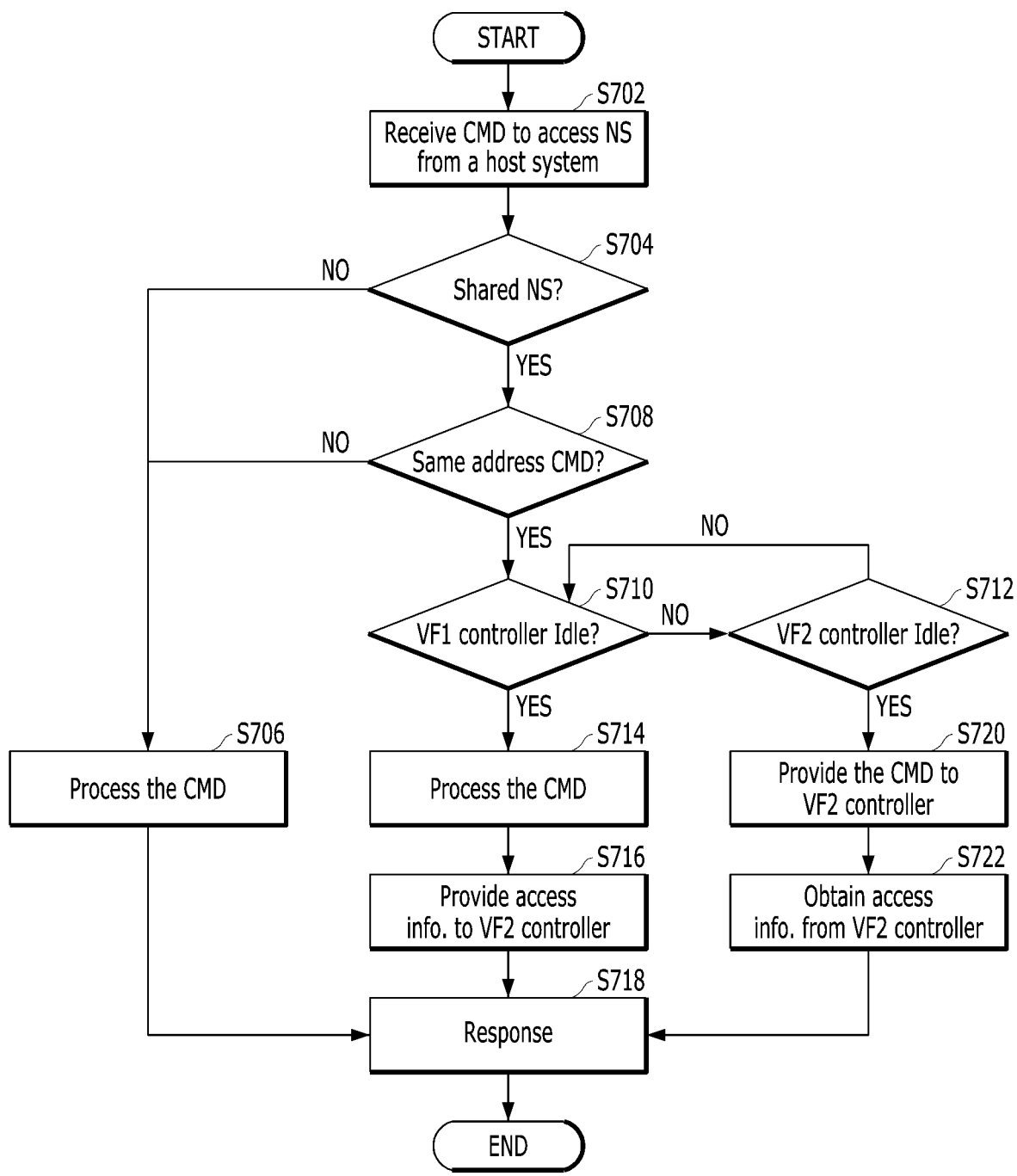
FIGS. 7 to 9 are diagrams illustrating an operation of a memory system in accordance with a second embodiment of the disclosed technology.
Figure 8:
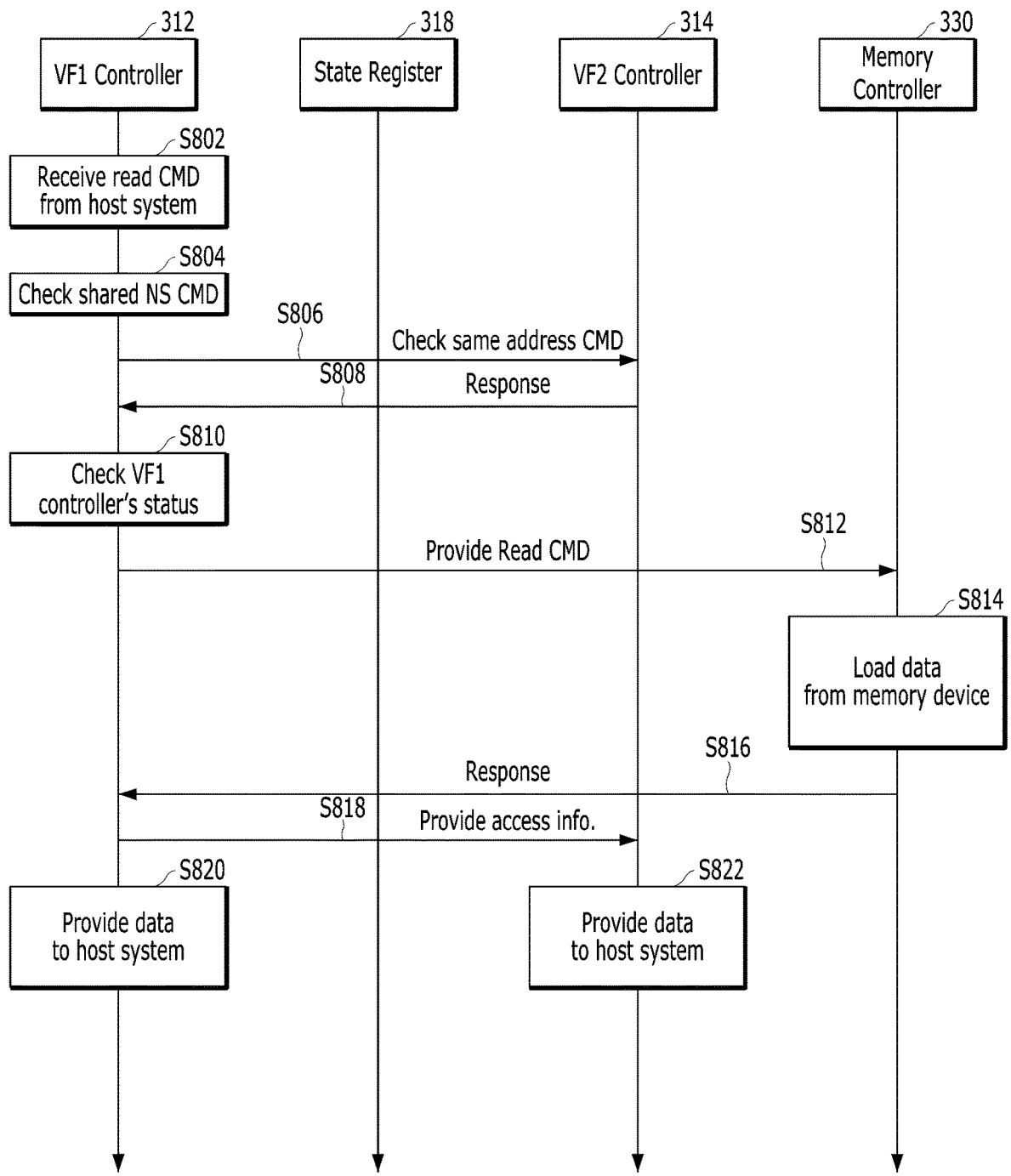
Figure 9:
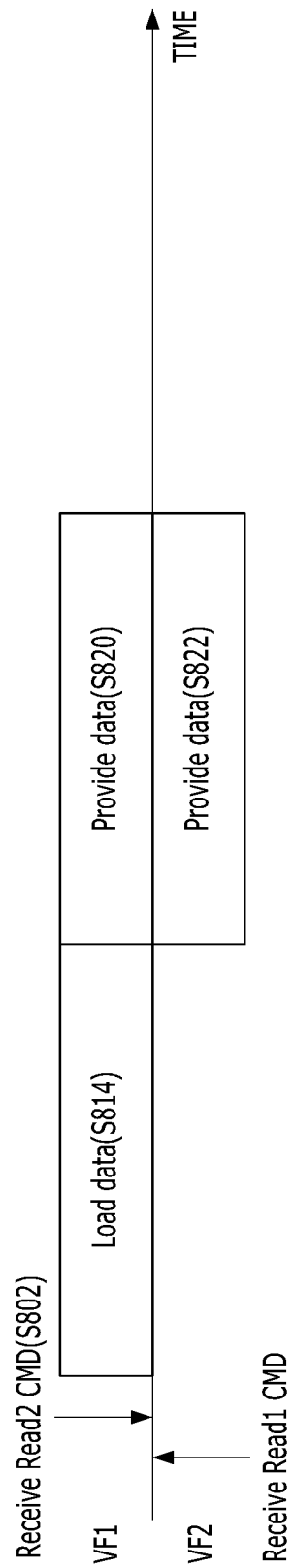

FIGS. 7 to 9 are diagrams illustrating an operation of the memory system 300 in accordance with a second embodiment.

FIG. 7 is a flowchart illustrating an operation of a virtual function controller in accordance with the second embodiment. FIG. 7 illustrates that the first virtual function controller 312 performs steps S702, S704, S706, S708, S710, S712, S714, S716 and S718.

In step S702, the first virtual function controller 312 may receive a read command for accessing a namespace from the host system 200. The read command may include an NSID and a logical address.

In step S704, the first virtual function controller 312 may determine whether the read command is for accessing a shared namespace, based on the NSID included in the read command.

When the read command is not for accessing the shared namespace (that is, "NO" in step S704), the first virtual function controller 312 may directly process the read command in step S706. When the first virtual function controller 312 transmits the read command to the memory controller 330, read data corresponding to the read command may be loaded onto an allocated space of the buffer memory 370.

In step S718, the first virtual function controller 312 may provide the host system 200 with the loaded read data in response to the read command.

When the read command is for accessing the shared namespace (that is, "YES" in step S704), the first virtual function controller 312 may determine whether there is a virtual function controller that intends to read the same data among the other virtual function controllers, based on the NSID and the logical address, in step S708.

For example, the first virtual function controller 312 may determine whether there is the virtual function controller that intends to read the same data, by comparing the NSID and logical address of the read command, received in step S702, with NSIDs and logical addresses of read commands, which are received by respective virtual function controllers and not processed yet.

When there is no virtual function controller that intends to read the same data (that is, "NO" in step S708), the first virtual function controller 312 may perform steps S706 and S718.

When there is the virtual function controller that intends to read the same data (that is, "YES" in step S708), the first virtual function controller 312 may determine whether it is currently in an idle state, in step S710.

FIG. 7 illustrates the second embodiment by way of example in which the virtual function controller that intends to read the same data is the second virtual function controller 314.

When the first virtual function controller 312 is in the idle state (that is, "YES" in step S710), the first virtual function controller 312 may perform steps S714, S716 and S718.

In step S714, the first virtual function controller 312 may allocate a space of the buffer memory 370 in which the read data is to be stored, in order to directly process the read command, and provide the memory controller 330 with the read command. The memory controller 330 may load the read data onto the allocated space of the buffer memory 370 from a memory device.

In step S716, the first virtual function controller 312 may provide the second virtual function controller 314 with access information on the allocated space of the buffer memory 370. The first and second virtual function controllers 312 and 314 may access the allocated space of the buffer memory 370.

In step S718, the first virtual function controller 312 may access the allocated space of the buffer memory 370 and provide the host system 200 with the read data, in response to the read command. Similarly, the second virtual function controller 314 that has obtained the access information may access the allocated space of the buffer memory 370 and provide the host system 200 with the read data, in response to a read command for accessing the same memory location.

When the first virtual function controller 312 is in a busy state (that is, "NO" in step S710), the first virtual function controller 312 may determine whether the second virtual function controller 314 is in the idle state, in step S712. The first virtual function controller 312 may determine whether the second virtual function controller 314 is in the idle state, through the state register 318 coupled to the physical function controller 310.

When the second virtual function controller 314 is in the idle state (that is, "YES" in step S712), the first virtual function controller 312 may perform steps S720, S722 and S718.

In step S720, the first virtual function controller 312 may provide the second virtual function controller 314 with the read command.

The second virtual function controller 314 may allocate a space of the buffer memory 370 for loading the read data, and provide the memory controller 330 with the read command. The memory controller 330 may load the read data onto the allocated space of the buffer memory 370 from a memory device. The second virtual function controller 314 may provide the first virtual function controller 312 with access information so that the first virtual function controller 312 may access the allocated space of the buffer memory 370.

In step S722, the first virtual function controller 312 may obtain the access information from the second virtual function controller 314.

In step S718, the first virtual function controller 312 may provide the host system 200 with the loaded read data in response to the read command. When the second virtual function controller 314 processes the read command for accessing the same memory location, the second virtual function controller 314 may provide the host system 200 with the read data loaded onto the allocated space of the buffer memory 370.

When the second virtual function controller 314 is in the busy state (that is, "NO" in step S712), the first virtual function controller 312 may repeatedly perform steps S710 and S712 until any one of the first and second virtual function controllers 312 and 314 becomes the idle sate.

According to the second embodiment of the present disclosure, when two or more virtual function controllers receive a read command for accessing the same memory location of a shared namespace, only one virtual function controller in an idle state may process the read command, and provide another virtual function controller with access information on a space of the buffer memory 370 onto which read data is loaded. When two or more virtual machines desire to read data of the same memory location, a virtual function controller capable of first processing the read command may provide the two or more virtual machines with the read data even though the virtual function controller loads the read data only once from a memory device. Accordingly, access performance of the memory system 300 may be improved.

FIG. 8 illustrates transactions between constituent elements of the memory system 300 according to the second embodiment.

Specifically, FIG. 8 illustrates transactions of the first and second virtual function controllers 312 and 314, the state register 318 and the memory controller 330, and the contents already described with reference to FIG. 7 are omitted or briefly described.

In step S802, the first virtual function controller 312 may receive a read command from the host system 200.

In step S804, the first virtual function controller 312 may determine whether the read command is a command for accessing a shared namespace. In an example of FIG. 8, it is assumed that the read command is the command for accessing the shared namespace.

In step S806, the first virtual function controller 312 may determine whether another virtual function controller receives a read command for reading the same data as the read command.

For example, the first virtual function controller 312 may determine whether a read command for accessing the same address is received by accessing command queues of the other virtual function controllers. FIG. 8 only illustrates that the first virtual function controller 312 checks a command queue of the second virtual function controller 314, but the first virtual function controller 312 may also check a command queue of the third virtual function controller 316 that shares a shared namespace.

In step S808, the second virtual function controller 314 may provide a response to whether there is the command for reading the same data as the read command.

In the example of FIG. 8, it is assumed that the read command for reading the same data is queued in the command queue of the second virtual function controller 314.

Hereinafter, the read command received by the first virtual function controller 312 is referred to as a second read command. The read command for reading the same data, which is received by the second virtual function controller 314 ahead of the second read command and queued in the command queue, is referred to as a first read command.

In step S810, the first virtual function controller 312 may determine whether it is in a busy or idle state. In the example of FIG. 8, it is assumed that the state of the first virtual function controller 312 is in the idle state. Meanwhile, since the first read command is queued in the second virtual function controller 314, the second virtual function controller 314 may currently be in the busy state.

In steps S812, S814 and S816, the first virtual function controller 312 may process the second read command. Since the first and second read commands are commands for the same memory location, the same processing result for the first read command by the second virtual function controller 314 may be provided to the host system 200 when the first virtual function controller 312 processes the second read command.

In step S812, the first virtual function controller 312 may allocate a space of the buffer memory 370, and provide the memory controller 330 with the read command for the same memory location.

In step S814, the memory controller 330 may load read data corresponding to the read command onto the allocated space of the buffer memory 370 from a memory device.

In step S816, the memory controller 330 may provide the first virtual function controller 312 with a response.

In step S818, the first virtual function controller 312 may provide the second virtual function controller 314 with access authority on the allocated space of the buffer memory 370. The first and second virtual function controllers 312 and 314 have the authority on the allocated space of the buffer memory 370.

In step S820, the first virtual function controller 312 may access the allocated space of the buffer memory 370, and provide the host system 200 with the read data.

In step S822, the second virtual function controller 314 may access the allocated space of the buffer memory 370, and provide the host system 200 with the read data.

FIG. 9 schematically illustrates an operational timing according to the second embodiment described above with reference to FIG. 8.

FIG. 9 illustrates operational timings of a first virtual function VF1 and a second virtual function VF2 on the same time axis. FIG. 9 represents the operational timings of some of the steps described with reference to FIG. 8.

Referring to FIG. 9, the second virtual function controller 314 may receive the first read command for a shared namespace from the host system 200, and queue the first read command in a command queue CMDQ. In this case, the second virtual function controller 314, which is currently in a busy state, may not process the first read command.

In step S802, the first virtual function controller 312 may receive the second read command for accessing the same memory location as the first read command from the host system 200, and queue the second read command in the command queue CMDQ. The first virtual function controller 312 may check the first read command queued in the second virtual function controller 314, by performing steps S804, S806, S808 and S810.

In step S814, the memory controller 330 may process the second read command, and load data in the memory location onto an allocated space of the buffer memory 370. In step S818, the first virtual function controller 312 may provide the second virtual function controller 314 with access authority on the allocated space of the buffer memory 370.

In step S820, the first virtual function controller 312 may provide the host system 200 with the data in response to the second read command.

In step S822, the second virtual function controller 314 may provide the host system 200 with the data in response to the first read command.

According to the second embodiment of the present disclosure, when a plurality of virtual function controllers process respective read commands in order to read the same data of a shared namespace, one virtual function controller may process one read command, and provide another virtual function controller with access information of the buffer memory 370. Then, the plurality of virtual function controllers may provide a plurality of virtual machines with responses to the respective read commands. Therefore, at least one read operation of a memory device may be omitted, thereby improving access performance of the memory system 300.

According to embodiments of the present disclosure, when the first virtual function controller 312 receives a read command for accessing a shared namespace, the first virtual function controller 312 may determine whether the virtual function controllers sharing the shared namespace are in a busy or idle state. When the first virtual function controller 312 is in the busy state and the second virtual function controller 314 is in the idle state, the first virtual function controller 312 may control the second virtual function controller 314 to process the read command. When the second virtual function controller 314 loads data of the shared namespace onto an allocated space of the buffer memory 370, the second virtual function controller 314 may provide the first virtual function controller 312 with access authority on the allocated space. The first virtual function controller 312 may provide the host system 200 with the data loaded onto the allocated space, based on the access authority.

According to embodiments of the present disclosure, when a specific virtual function controller in the busy state accesses the shared namespace by using another virtual function controller, data throughput of virtual function controllers may be distributed, and access performance of the memory system 300 may be improved.

According to embodiments of the present disclosure, it is possible to provide a memory system and an operating method for the memory system, which can support a plurality of virtual functions and provide an improved access performance.

While specific embodiments have been described in the detailed description of the present disclosure, various modifications or enhancements of the disclosed embodiments, and other embodiments may be made based on what is disclosed or illustrated in this patent document.

What is claimed is:

1. A data processing system, comprising:
   one or more processors;
   a host system including a plurality of virtual machines; and
   a memory system including a plurality of virtual function controllers, a plurality of namespaces and a memory controller,
   wherein the plurality of virtual function controllers executed by the one or more processors to communicate with the plurality of virtual machines and receive a command for accessing the plurality of namespaces, respectively,
   wherein the memory controller executed by the one or more processors to communicate with the plurality of virtual function controllers and access the plurality of namespaces based on the command,
   wherein the plurality of namespaces have different storage capacities based on the plurality of virtual machines,
   wherein each of the plurality of namespaces are provided to one or more virtual functions,
   wherein the plurality of namespaces provided to only one virtual function are a plurality of dedicated namespaces and a single namespace provided to a plurality of virtual functions is a shared namespace,
   wherein the plurality of dedicated namespaces is accessible by only a corresponding virtual function controller and the shared namespace is accessible by the plurality of virtual function controllers, and
   wherein a first virtual machine of the plurality of virtual machines accesses a first dedicated namespace of the plurality of dedicated namespaces only through a first virtual function controller of the plurality of virtual function controllers, a second virtual machine accesses a second dedicated namespace only through a second virtual function controller, a third virtual machine accesses a third dedicated namespace only through a third virtual function controller, and the first to third virtual machines access the shared namespace through the first to third virtual function controllers.

2. The data processing system of claim 1, wherein each of the plurality of namespaces is an addressable logical memory space or domain associated with a physical memory space in the memory system.

3. The data processing system of claim 1, wherein the memory controller allocates logical addresses in a predetermined range to each of the plurality of namespaces.

4. The data processing system of claim 1, wherein when the first virtual function controller is in a busy state and at least one of the second virtual function controller and the third virtual function controller is in an idle state, the first virtual function controller provides the command to the at least one of the second virtual function controller and the third virtual function controller that is in the idle state.

5. The data processing system of claim 1, wherein the first virtual function controller is configured to process the command without providing the command to the second virtual function controller or the third virtual function controller when the first virtual function controller is in an idle state.

6. The data processing system of claim 1, wherein each of the plurality of namespaces has a unique namespace identifier (NSID).

7. The data processing system of claim 6, the host system specifies the NSID and a logical address to access a storage space of each of the plurality of namespaces.

8. A data processing system, comprising:
   one or more processors;
   a host system including a plurality of virtual machines; and
   a memory system including a plurality of virtual function controllers, a plurality of namespaces and a memory controller,
   wherein the plurality of virtual function controllers executed by the one or more processors to communicate with the plurality of virtual machines and receive a command for accessing the plurality of namespaces, respectively,
   wherein the memory controller executed by the one or more processors to communicate with the plurality of virtual function controllers and access the plurality of namespaces based on the command,
   wherein a shared namespace of the plurality of namespaces is commonly accessible by the plurality of virtual function controllers,
   wherein each of the plurality of namespaces are provided to one or more virtual functions, wherein the plurality of namespaces which are provided to only one virtual function are a plurality of dedicated namespaces, wherein the plurality of dedicated namespaces is accessible by only a corresponding virtual function controller, and wherein a first virtual machine of the plurality of virtual machines accesses a first dedicated namespace of the plurality of dedicated namespaces only through a first virtual function controller of the plurality of virtual function controllers, a second virtual machine accesses a second dedicated namespace only through a second virtual function controller, a third virtual machine accesses a third dedicated namespace only through a third virtual function controller, and the first to third virtual machines access the shared namespace through the first to third virtual function controllers.

9. The data processing system of claim 8, wherein when the first virtual function controller is in a busy state and at least one of the second virtual function controller and the third virtual function controller is in an idle state, the first virtual function controller provides the command to the at least one of the second virtual function controller and the third virtual function controller that is in the idle state.

10. The data processing system of claim 8, wherein the first virtual function controller is configured to process the command without providing the command to the second virtual function controller or the third virtual function controller when the first virtual function controller is in an idle state.

11. The data processing system of claim 8, wherein the shared namespace is a single namespace provided to a plurality of virtual functions.

12. The data processing system of claim 8, wherein the host system includes a system using a network interface.

* * * * *